US009462607B2

(12) United States Patent
Ma et al.

(10) Patent No.: US 9,462,607 B2
(45) Date of Patent: Oct. 4, 2016

(54) APPARATUS, METHOD AND SYSTEM OF MULTI-USER UPLINK TRANSMISSION

(71) Applicant: INTEL IP CORPORATION, Santa Clara, CA (US)

(72) Inventors: Yongsen Ma, Williamsburg, VA (US); Rongzhen Yang, Shanghai (CN); Peng Meng, Shanghai (CN); Qinghua Li, San Ramon, CA (US); Huaning Niu, Milpitas, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 81 days.

(21) Appl. No.: 14/470,954

(22) Filed: Aug. 28, 2014

(65) Prior Publication Data

US 2016/0066342 A1    Mar. 3, 2016

(51) Int. Cl.
*H04Q 7/00*    (2006.01)
*H04W 72/12*    (2009.01)

(52) U.S. Cl.
CPC ..... *H04W 72/1289* (2013.01); *H04W 72/1268* (2013.01)

(58) Field of Classification Search
USPC ................... 370/334, 338, 328, 329
See application file for complete search history.

(56) References Cited

U.S. PATENT DOCUMENTS

| | | | |
|---|---|---|---|
| 8,306,010 B2 | 11/2012 | Gong et al. | |
| 2007/0153727 A1 | 7/2007 | McBeath et al. | |
| 2010/0046460 A1* | 2/2010 | Kwak ................... | H04L 1/1854 370/329 |
| 2011/0026446 A1* | 2/2011 | Stacey .................. | H04L 1/1614 370/310 |
| 2011/0216713 A1* | 9/2011 | Kim ....................... | H04L 5/0053 370/329 |
| 2011/0249643 A1* | 10/2011 | Barbieri ................ | H04L 1/0026 370/329 |
| 2011/0287798 A1* | 11/2011 | Ono ....................... | H04B 7/024 455/509 |
| 2012/0087358 A1* | 4/2012 | Zhu ..................... | H04W 72/042 370/338 |
| 2012/0252474 A1* | 10/2012 | Tiirola .................. | H04L 5/0048 455/450 |
| 2013/0016707 A1 | 1/2013 | He et al. | |
| 2014/0119288 A1 | 5/2014 | Zhu et al. | |
| 2015/0319747 A1* | 11/2015 | Chu .................. | H04W 72/0406 370/330 |

FOREIGN PATENT DOCUMENTS

| | | |
|---|---|---|
| WO | 2008020731 | 2/2008 |
| WO | 2014029041 | 2/2014 |

OTHER PUBLICATIONS

International Search Report and Written Opinion of PCT/US2015/037609, mailed on Oct. 16, 2015, 13 pages.

(Continued)

*Primary Examiner* — Duc C Ho
(74) *Attorney, Agent, or Firm* — Shichrur & Co.

(57) ABSTRACT

Some demonstrative embodiments include devices, systems and methods of multi-user uplink transmission. For example, an apparatus may include a transmitter to transmit a multi-user (MU) downlink transmission to a plurality of wireless stations; a receiver to receive from the plurality of wireless stations a plurality of acknowledgement (ACK) frames, at least one ACK frame from at least one wireless station including an uplink scheduling request indicating uplink resources requested by the wireless station; and a scheduler to schedule an uplink transmission from the at least one wireless station based on the uplink scheduling request, the transmitter to transmit at least one scheduling frame including scheduling information of the scheduled uplink transmission.

25 Claims, 8 Drawing Sheets

(56) References Cited

OTHER PUBLICATIONS

Guowang Miao, 'Energy-Efficient Uplink Multi-User MIMO', Wireless Communications, IEEE Transactions on (vol. 12, Issue:5), 15 pages (pp. 2302-2313), Apr. 11, 2013.

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

IEEE Std 802.11ac™—2013. IEEE Standard for Information technology—Telecommunications and information exchange between systems Local and metropolitan area networks—Specific requirements: Part 11: Wireless LAN Medium Access Control (MAC) and Physical Layer (PHY) Specifications, Amendment 4: Enhancements for Very High Throughput for Operation in Bands below 6 GHz, IEEE Computer Society, Dec. 11, 2013, 425 pages.

ETSI TS 136 300 V11.3.0 (Nov. 2012): LTE; Evolved Universal Terrestrial Radio Access (E-UTRA) and Evolved Universal Terrestrial Radio Access Network (EUTRAN); Overall description; Stage 2 (3GPP TS 36.300 version 11.3.0 Release 11), Nov. 2012, 217 pages.

\* cited by examiner

APPARATUS, METHOD AND SYSTEM OF MULTI-USER UPLINK TRANSMISSION

TECHNICAL FIELD

Embodiments described herein generally relate to Multi-User (MU) uplink transmission.

BACKGROUND

Some wireless communication systems may communicate according to a multi-user (MU) communication scheme, in which a wireless communication device, e.g., an Access point (AP), may communicate MU transmissions with a group of wireless communication devices, e.g., wireless stations.

In one example, the MU transmissions may include, for example, a MU Multi-Input-Multi-Output (MU-MIMO) transmission, e.g., as defined by the IEEE 802.11ac Specification (*"IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz"*, December, 2013).

In another example, the MU transmissions may include, for example, an Orthogonal Frequency-Division Multiple Access (OFDMA).

The AP may be able to schedule a MU downlink transmission from the AP to the plurality of wireless stations, for example, based on information relating to the downlink transmission, e.g., a size of data to be transmitted during the MU downlink transmission, which may be available at the AP.

In contrast to the MU downlink transmission, in order to efficiently schedule an uplink transmission from the wireless stations to the AP, the AP may need to receive from the wireless stations information regarding uplink data to be transmitted during the uplink transmission.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
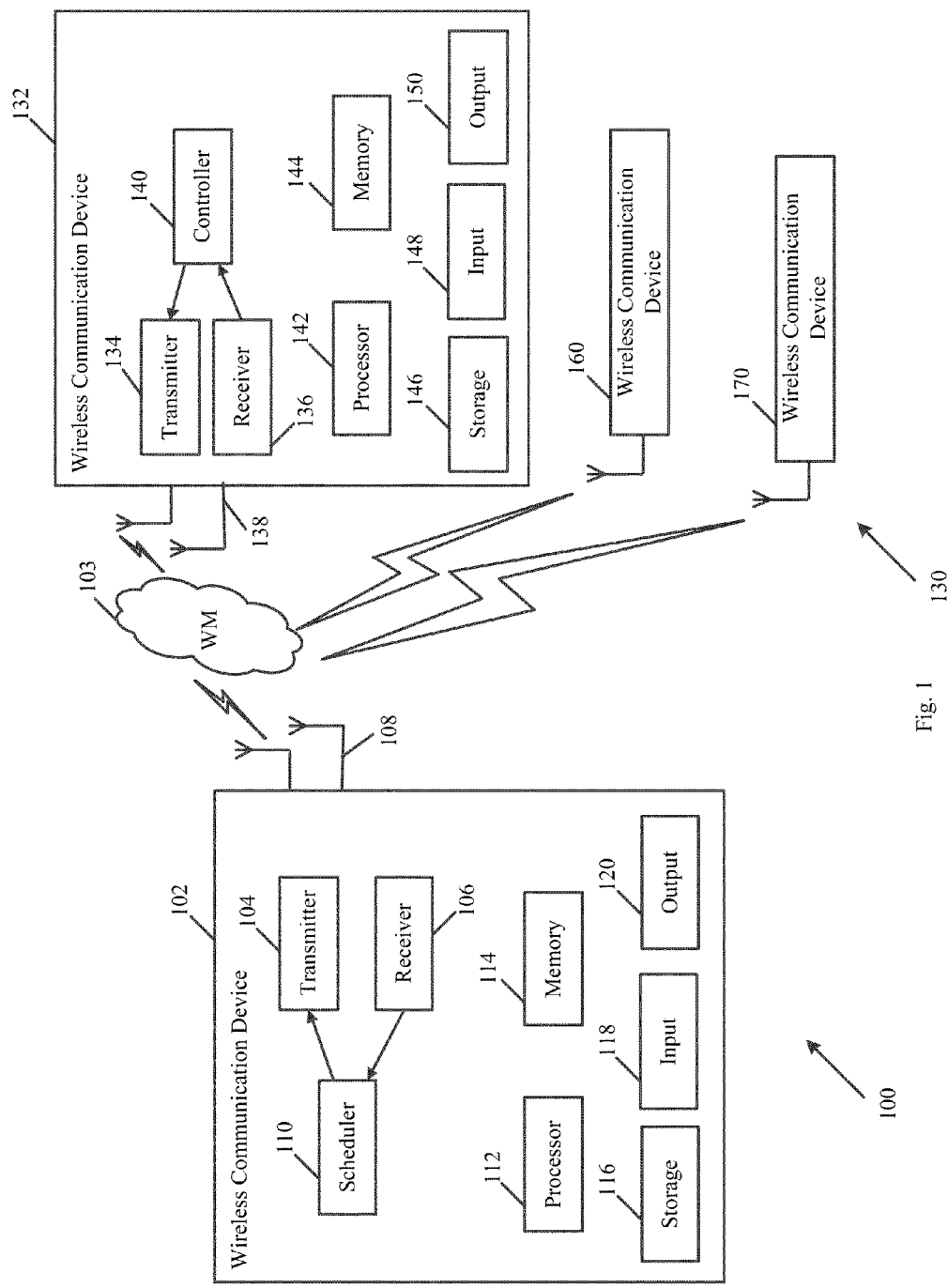
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless Station (STA), a communication node, an Access Point (AP), a Personal Computer (PC), a desktop computer, a mobile computer, a laptop computer, a notebook computer, an Ultrabook™ computer, a tablet computer, a server computer, a handheld computer, a handheld device, a Personal Digital Assistant (PDA) device, a handheld PDA device, a Bluetooth (BT) device, a Bluetooth Low Energy (BLE) device, an on-board device, an off-board device, a hybrid device, a vehicular device, a non-vehicular device, a mobile or portable device, a consumer device, a non-mobile or non-portable device, a wireless communication station, a wireless communication device, a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; *IEEE*802.11ac (*"IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz"*, December, 2013"); *IEEE 802.11ad* (*"IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band"*, 28 Dec. 2012); and/or IEEE 802.11 ax) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) ("the LTE Standards) (including *ETSI TS* 136 300 *V*11.3.0 (2012-11): *LTE; Evolved Universal Terrestrial Radio Access (E-UTRA) and Evolved Universal Terrestrial Radio Access Network (E-UTRAN); Overall description; Stage* 2 (3*GPP TS* 36.300 version 11.3.0 *Release* 11), 2012), and/or future versions and/or derivatives thereof, units and/or devices which are part of the above networks, and the like.

Some embodiments may be used in conjunction with one way and/or two-way radio communication systems, multi-radio devices, cellular radio-telephone communication systems, a User Equipment (UE), a mobile device, a wireless station (STA), a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, a Mobile Internet Device (MID), or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Spatial Divisional Multiple Access (SDMA), Multi-User (MU) MIMO (MU-MIMO), Single Carrier Frequency-Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), BT, BLE, Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a Wireless Fidelity (WiFi) network, or a WLAN according to the IEEE 802 Standards (also referred to as "the 802 network"). Other embodiments may be used in conjunction with any other suitable wireless communication network, for example, a wireless area network, a "piconet", a WPAN, a WVAN and the like.

Some demonstrative embodiments may be used in conjunction with a LTE cellular network. However, other embodiments may be used in conjunction with any other suitable cellular network, e.g., a 3G cellular network, a 4G cellular network, a 5G cellular network, a WiMax cellular network, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "substantially simultaneously" and "simultaneously", as used herein with reference to transmitting to two or more different wireless communication devices and/or receiving from two or more wireless communication devices, may refer to transmitting and/or receiving two or more transmissions, wherein at least a portion of each transmission and/or reception occurs at the same time, but does not imply that the different transmissions and/or receptions must start and/or end at the same time, although they may.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

Reference is now made to FIG. 1, which schematically illustrates a block diagram of a system 100 in accordance with some demonstrative embodiments.

In some demonstrative embodiments, system 100 may include a wireless communication network including one or more wireless communication devices, e.g., wireless communication devices 102, 132, 160, and/or 170, capable of communicating content, data, information and/or signals over a wireless medium 103.

In some demonstrative embodiments, wireless medium 103 may include, for example, a radio channel, a cellular channel, an RF channel, a WLAN channel, a Wireless Fidelity (WiFi) channel, an IR channel, and the like. One or more elements of system 100 may optionally be capable of communicating over any suitable wired communication links.

In some demonstrative embodiments, system 100 may include one or more non-AP stations, e.g., client STAs, and one or more APs. For example, device 102 may perform the functionality of an AP, e.g., a WiFi AP, a router, and the like; and wireless communication devices 132, 160 and/or 170 may perform the functionality of non-AP stations.

In some demonstrative embodiments, wireless communication device 102 may include a mobile or a non-mobile device, e.g., a static device.

In some demonstrative embodiments, wireless communication device 102 may include, for example, a node, an AP, an Access Controller (AC), a personal basic service set (PBSS) control point (PCP), a network controller, a Group Owner (GO), a network coordinator, a base station, a router, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a context-aware device, a video device, an audio device, an A/V device, a Set-Top-Box (STB), a video source, an audio source, a video sink, an audio sink, a stereo tuner, a broadcast radio receiver, a flat panel display, a Personal Media Player (PMP), a data source, a data sink, a, or the like.

In some demonstrative embodiments, wireless communication devices 132, 160, and/or 170 may include, for example, a User Equipment (UE), a Mobile Device (MD), a mobile station, a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device, a consumer device, a vehicular device, a non-vehicular device, a portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), an "Origami" device or computing device, a video device, an audio device, an A/V device, a gaming device, a media player, a Smartphone, or the like.

In some demonstrative embodiments, wireless communication device 102 may also include, for example, a processor 112, an input unit 118, an output unit 120, a memory unit 114, and a storage unit 116; and/or wireless communication devices 132, 160 and/or 170 may also include, for example, a processor 142, an input unit 148, an output unit 150, a memory unit 144, and a storage unit 146. Wireless communication devices 102, 132, 160, and/or 170 may optionally include other suitable hardware components and/or software components. In some demonstrative embodiments, some or all of the components of wireless communication devices 102, 132, 160, and/or 170 may be enclosed in a common housing or packaging, and may be interconnected or operably associated using one or more wired or wireless links. In other embodiments, components of wireless communication devices 102, 132, 160, and/or 170 may be distributed among multiple or separate devices.

Processor 112 and/or processor 142 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 112 executes instructions, for example, of an Operating System (OS) of device 102 and/or of one or more suitable applications; and/or processor 142 executes instructions, for example, of an Operating System (OS) of device 132 and/or of one or more suitable applications.

Memory unit 114 and/or memory unit 144 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 116 and/or storage unit 146 may include, for example, a hard disk drive, a floppy disk drive, a Compact Disk (CD) drive, a CD-ROM drive, a DVD drive, or other suitable removable or non-removable storage units. For example, memory unit 114 and/or storage unit 116, for example, may store data processed by device 102; and/or memory unit 144 and/or storage unit 146, for example, may store data processed by device 132.

Input unit 118 and/or input unit 148 may include, for example, a keyboard, a keypad, a mouse, a touch-screen, a touch-pad, a track-ball, a stylus, a microphone, or other suitable pointing device or input device. Output unit 120 and/or output unit 150 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, wireless communication devices 102, 132, 160, and/or 170 may include wireless communication units to perform wireless communication between wireless communication devices 102, 132, 160, and/or 170 and/or with one or more other wireless communication devices. For example, wireless communication device 102 may include a transmitter (Tx) 104 and a receiver (Rx) 106; and/or wireless communication units 132, 160 and/or 170 may include a transmitter 134 and a receiver 136.

In some demonstrative embodiments, transmitter 104, receiver 106, transmitter 134, and/or receiver 136 may be configured to communicate wireless communication signals, RF signals, frames, blocks, transmission streams, messages, data items, and/or data. In one example, transmitter 104, receiver 106, transmitter 134, and/or receiver 136 may include circuitry, modulation elements, demodulation elements, amplifiers, analog to digital and/or digital to analog converters, filters, RF circuitry, Baseband (BB) circuitry, and/or the like. For example, transmitter 104, receiver 106, transmitter 134, and/or receiver 136 may include or may be implemented as part of a transceiver, a wireless Network Interface Card (NIC), and the like.

In some demonstrative embodiments, transmitter 104, receiver 106, transmitter 134, and/or receiver 136 may include, or may be associated with, one or more antennas. For example, transmitter 104 and/or receiver 106 may be associated with one or more antennas 108, e.g., a single antenna or two or more antennas; and/or transmitter 134, and/or receiver 136 may be associated with one or more antennas 138, e.g., a single antenna or two or more antennas.

Antennas 108 and/or 138 may include any type of antennas suitable for transmitting and/or receiving wireless communication signals, blocks, frames, transmission streams, messages and/or data. For example, antennas 108 and/or 138 may include any suitable configuration, structure and/or arrangement of one or more antenna elements, components, units, assemblies and/or arrays. Antennas 108 and/or 138 may include, for example, antennas suitable for directional communication, e.g., using beamforming techniques. For example, antennas 108 and/or 138 may include a phased array antenna, a multiple element antenna, a set of switched beam antennas, and/or the like. In some embodiments, antennas 108 and/or 138 may implement transmit and receive functionalities using separate transmit and receive antenna elements. In some embodiments, antennas 108 and/or 138 may implement transmit and receive functionalities using common and/or integrated transmit/receive elements.

In some demonstrative embodiments, transmitter 104 may be capable of simultaneously transmitting downlink (DL) transmissions to two or more other devices of system 100, e.g., two or more of devices 132, 160 and 170.

In some demonstrative embodiments, receiver 106 may be capable of simultaneously receiving uplink (UL) transmissions from two or more other devices of system 100, e.g., two or more of devices 132, 160 and 170.

In some demonstrative embodiments, wireless communication devices 102, 132, 160 and/or 170 may be capable of performing Multi-User (MU) communication. For example, transmitter 104 may transmit a downlink MU transmission by transmitting different signals substantially simultaneously to two or more of devices 132, 160 and 170. Receiver 106 may receive an uplink MU transmission by simultaneously receiving different signals from two or more of devices 132, 160 and 170.

In some demonstrative embodiments, the MU communication may include a MU MIMO communication. For example, transmitter 104 may transmit a downlink MU-MIMO transmission to two or more of devices 132, 160 and 170. Receiver 106 may receive an uplink MU-MIMO transmission from two or more of devices 132, 160 and 170.

In some embodiments, wireless communication devices 102, 132, 160 and/or 170 may be capable of performing Spatial Division Multiple Access (SDMA) communication. For example, transmitter 104 may transmit a downlink SDMA transmission by transmitting different signals substantially simultaneously via antennas 108, for example, such that the combined transmitted signals result in different signals, which are to be received by two or more other wireless communication devices of system 100, being transmitted substantially in different directions, e.g., on the same frequency.

In some demonstrative embodiments, receiver 106 may receive an uplink SDMA transmission including different signals from two or more other devices of system 100.

In some demonstrative embodiments, the MU communication may include an OFDMA communication. For example, transmitter 104 may transmit a downlink OFDMA transmission to two or more of devices 132, 160 and 170. Receiver 106 may receive an uplink OFDMA transmission from two or more of devices 132, 160 and 170.

In some demonstrative embodiments, wireless communication device 102 may communicate with at least one group ("the MU group") of a plurality of wireless communication devices of system 100, for example, a group including two or more of devices 132, 160 and 170.

In some demonstrative embodiments, wireless communication device 102 may use a group identifier (ID) to communicate MU communications with the MU group, e.g., including two or more of devices 132, 160 and 170. For example, transmitter 104 may transmit to devices of the MU group a MU downlink transmission including the group ID of the MU group; and/or transmitter 134 of devices 132, 160 and/or 170 may transmit to device 102 a MU uplink transmission including the group ID of the MU group.

In some demonstrative embodiments, wireless communication device 102 may include a scheduler 110 to schedule uplink MU and/or downlink MU communications between device 102 and devices 132, 160 and/or 170. In some demonstrative embodiments, scheduler 110 may include or may be implemented using suitable circuitry, e.g., processor circuitry, memory circuitry, Media-Access Control (MAC) circuitry, Physical Layer (PHY) circuitry, and/or any other circuitry, which may be configured to perform at least part of the functionality of scheduler 110.

In some demonstrative embodiments, scheduler 110 may be configured to schedule a MU downlink transmission from device 102 to devices 132, 160 and/or 170, for example, based on information relating to the downlink MU transmission, e.g., a size and/or type of data to be transmitted during the MU downlink transmission, channel conditions of one or more channels between device 102 and devices 132, 160, and/or 170, a prioritization of the devices 132, 160, and/or 170, and/or any other information pertaining to the MU downlink transmission.

In some demonstrative embodiments, scheduler 110 may be able to schedule a MU uplink transmission from devices 132, 160 and/or 170 to device 102, e.g., as described below.

In some demonstrative embodiments, devices 102, 132, 160 and/or 170 may be configured to enable devices 132, 160, and/or 170 to provide to device 102 resource information pertaining to the MU uplink transmission, for example, in a manner which may enable scheduler 110 to take into consideration the resource information, when scheduling the MU uplink transmission, e.g., as described below.

In some demonstrative embodiments, it may not be efficient to use dedicated control and/or feedback frames to provide the resource information from devices 132, 160 and/or 170 to device 102, for example, since the dedicated frames may introduce extra overhead, which may result in a reduction in available uplink resources. The impact of the dedicated frames on the available uplink resources may be substantial, for example, when one or more of devices 132, 160 and/or 170 do not require uplink resources.

In one example, having an AP, e.g., device 102, coordinate separate dedicated Request to Send (RTS) messages from a plurality of stations, e.g., devices 132, 160 and/or 170, may impose complex control frames and strict synchronization requirements.

In another example, scheduling the MU uplink transmission using a group RTS scheme may be inefficient. For example, according to the group RTS scheme, one station of a MU group may send a group RTS frame to request assignment of uplink resources, and the AP may schedule UL resources for all stations of the MU group based on the group RTS frame. Accordingly, UL resources may be wasted, e.g., if one or more other stations of the group have no UL data to transmit.

In another example, a direct assignment scheme may include the AP assigning UL resources for all stations of the MU group, e.g., without having prior knowledge of actual UL resources required by stations of the group. Although the direct assignment scheme may be simplified, UL resources may be wasted, e.g., if one or more other stations of the group have no UL data to transmit.

In some demonstrative embodiments, devices 102, 132, 160 and/or 170 may implement a MU UL scheduling scheme, which may be configured to utilize acknowledgement (ACK) messages to convey uplink resource requests from devices 132, 160 and/or 170 to device 102, e.g., as described below.

In some demonstrative embodiments, receiver 136 may be configured to transmit to device 102 an ACK message ("the extended ACK message" or EACK) to acknowledge a MU downlink transmission from device 102. The EACK message may include an uplink resource request to indicate UL resources requested by device 132 for an UL transmission to device 102, e.g., as described below.

In some demonstrative embodiments, enabling a station, e.g., device 132, to transmit to an AP, e.g., device 102, an ACK message including an UL resource request, may enable the AP to take into consideration actual UL resources required by the station, when scheduling UL resources for the station.

In some demonstrative embodiments, scheduling UL transmissions, based on the actual requested UL resources, may improve the efficiency of UL resource assignments.

In some demonstrative embodiments, enabling a station, e.g., device 132, to transmit to an AP, e.g., device 102, an ACK message including an UL resource request, may obviate the need for communicating dedicated control requests from the station to the AP. Accordingly, enabling a station, e.g., device 132, to transmit to an AP, e.g., device 102, an ACK message including an UL resource request may enable a simplified scheduling request procedure, while reducing overhead.

In some demonstrative embodiments, enabling a station, e.g., device 132, to transmit to an AP, e.g., device 102, an ACK message including an UL resource request, may obviate the need for a backoff procedure, which may be required, for example, to facilitate communication of dedicated messages carrying the UL resource request. Accordingly, a waiting time of UL transmissions may be reduced and, as a result, frame completion time may be reduced.

In some demonstrative embodiments, transmitter 104 may transmit a MU downlink transmission to a plurality of wireless stations, e.g., including two or more of wireless communication devices 132, 160 and 170.

In some demonstrative embodiments, the MU downlink transmission may include a plurality of different downlink data transmissions simultaneously transmitted to the plurality of wireless stations.

In one example, the MU downlink transmission may include a MU-MIMO downlink transmission, or an OFDMA downlink transmission.

In some demonstrative embodiments, receiver 136 may receive downlink data of the MU downlink transmission. For example, the downlink data may include a part of data of the MU downlink transmission, which is to be received by device 132.

In some demonstrative embodiments, wireless communication device 132 may include a controller 140 to determine uplink resources of an uplink transmission from device 132 to device 102. For example, controller 140 may determine the uplink resources based on an amount of date pending transmission to device 102, a bandwidth for communicating the UL transmission from device 132 to device 102, channel conditions of a wireless channel between device 132 and device 102, and/or any other parameter and/or criterion.

In some demonstrative embodiments, controller 140 may include or may be implemented using suitable circuitry, e.g., processor circuitry, memory circuitry, MAC circuitry, PHY circuitry, and/or any other circuitry, which may be configured to perform at least part of the functionality of controller 140.

In some demonstrative embodiments, transmitter 134 may transmit to device 102 an ACK frame, e.g., an EACK frame, to acknowledge receipt of the downlink data.

In some demonstrative embodiments, the ACK frame may include an uplink scheduling request indicating the uplink resources requested by device 132, e.g., as described below.

In some demonstrative embodiments, an ACK frame communicated from a first wireless device, e.g., device 132, to a second wireless device, e.g., device 102, may include a scheduling request indicator to indicate whether or not the ACK frame includes the uplink scheduling request, and a size field indicating a data size of uplink data requested to be transmitted from the first device to the second device, e.g., as described below with reference to FIG. 2.

In some demonstrative embodiments, receiver 106 may receive from the plurality of wireless stations a plurality of ACK frames to acknowledge receipt of the MU downlink transmission.

In some demonstrative embodiments, the plurality of ACK frames may include at least one ACK frame from at least one wireless station including an uplink scheduling request indicating uplink resources requested by the wireless station. For example, receiver 106 may receive the ACK frame from device 132, including the uplink scheduling request indicating the uplink resources requested by device 132.

In some demonstrative embodiments, the plurality of ACK frames may be communicated in a sequential manner or in a simultaneous manner.

In one example, transmitter 104 may transmit a unicast acknowledgement request, e.g., a unicast Block ACK Request (BAR), to each wireless station of the plurality of stations, and receiver 106 may receive an ACK frame, e.g., a Block ACK (BA), from each of the wireless stations, e.g., in response to each unicast acknowledgement request, for example, as described below with respect to FIG. 4.

In another example, transmitter 104 may transmit a MU acknowledgement request, e.g., a MU BAR, to the plurality of wireless stations, and receiver 106 may simultaneously receive the plurality of ACK frames, e.g., a plurality of EACK frames, in response to the MU acknowledgement request, e.g., as described below with respect to FIG. 5.

In some demonstrative embodiments, scheduler 110 may schedule an uplink transmission from the at least one wireless station, e.g., from device 132, based on the uplink scheduling request. For example, scheduler 110 may schedule the uplink transmission from device 132, based on a relationship between the requested uplink resources from device 132 and requested uplink resources form one or more other devices, e.g., devices 160 and/or 170; based on a relationship between the requested uplink resources from device 132 and a total amount of available uplink resources; based on an uplink priority assigned to device 132, e.g., relative to a priority of one or more other devices; based on channel conditions of the wireless channel between device 102 and device 132; and/or based on any other parameter and/or criterion, e.g., as described below.

In some demonstrative embodiments, transmitter 104 may transmit at least one scheduling frame including scheduling information of the scheduled uplink transmission.

In some demonstrative embodiments, the scheduling frame may include a unicast uplink scheduling frame, which may be addressed to a single wireless station, for example, if uplink resources are to be scheduled to the single wireless station.

In some demonstrative embodiments, the scheduling frame may include a MU uplink scheduling frame, which may be addressed to a plurality of wireless stations, for example, if uplink resources are to be scheduled to a plurality of wireless stations, e.g., as described below.

In some demonstrative embodiments, receiver 106 may receive two or more ACK frames including two or more respective uplink scheduling requests from two or more wireless stations.

In some demonstrative embodiments, scheduler 110 may schedule a MU uplink transmission from the two or more wireless stations based on the two or more uplink scheduling requests.

In one example, device 102 may transmit a MU downlink transmission to devices 132, 160 and 170; device 132 may transmit a first ACK frame including a first uplink scheduling request to schedule uplink resources for an UL transmission from device 132 to device 102; device 160 may transmit a second ACK frame including a second uplink scheduling request to schedule uplink resources for an UL transmission from device 160 to device 102; and device 170 may transmit a third ACK frame not including an uplink scheduling request, e.g., if device 170 has no uplink data for device 102.

According to this example, scheduler 110 may schedule a MU uplink transmission from devices 132 and 160, for example, based on the first and second uplink scheduling requests, e.g., while not scheduling any uplink resources for device 170. Transmitter 104 may transmit a MU scheduling frame to inform devices 132 and 160 of uplink resources scheduled for devices 132 and 160.

In another example, device 102 may transmit a MU downlink transmission to devices 132, 160 and 170; device 132 may transmit a first ACK frame including a first uplink scheduling request to schedule uplink resources for an UL transmission from device 132 to device 102; device 160 may transmit a second ACK frame including a second uplink scheduling request to schedule uplink resources for an UL transmission from device 160 to device 102; and device 170 may transmit a third ACK frame including a third uplink scheduling request to schedule uplink resources for an UL transmission from device 170 to device 102.

According to this example, scheduler 110 may schedule a MU uplink transmission from devices 132, 160 and 170, for example, based on the first, second, and third uplink scheduling requests. Transmitter 104 may transmit a MU scheduling frame to inform devices 132, 160 and 170 of uplink resources scheduled for devices 132, 160, and 170.

In some demonstrative embodiments, the scheduling information in the scheduling frame may be based on the one or more uplink scheduling requests from devices 132, 160 and/or 170.

In some demonstrative embodiments, the scheduling information may include, for example, timing information indicating a timing of the scheduled uplink transmission, frequency information indicating a frequency of the scheduled uplink transmission, transmit power information indicating a transmit power of the scheduled uplink transmission, and/or any other information.

For example, the scheduling information corresponding to the UL transmission from device 132 may include timing information indicating a timing of the scheduled uplink transmission from device 132, frequency information indicating a frequency of the scheduled uplink transmission from device 132, transmit power information indicating a transmit power of the scheduled uplink transmission from device 132, and/or any other information.

In some demonstrative embodiments, device 102 may be allowed to transmit the scheduling frame a relatively short time after receiving the ACK frames from devices 132, 160 and/or 170, e.g., since the UL scheduling requests are being received as part of the ACK frames.

For example, transmitter 104 may transmit the scheduling frame to devices 132, 160 and/or 170 a Short Inter Frame Space (SIFS) after receipt of the plurality of ACK frames at receiver 106.

In some demonstrative embodiments, receiver 136 may receive the scheduling frame, and transmitter 134 may transmit the UL transmission to device 102 according to the scheduling information corresponding to device 132.

In some demonstrative embodiments, receiver 106 may receive the uplink transmission from one or more of wireless communication devices 132, 160 and 170, e.g., according to the scheduling information.

For example, receiver 106 may receive a MU uplink transmission including two or more simultaneous uplink data transmissions from two or more wireless stations, e.g., two or more of devices 132, 160 and 170.

Figure 2:
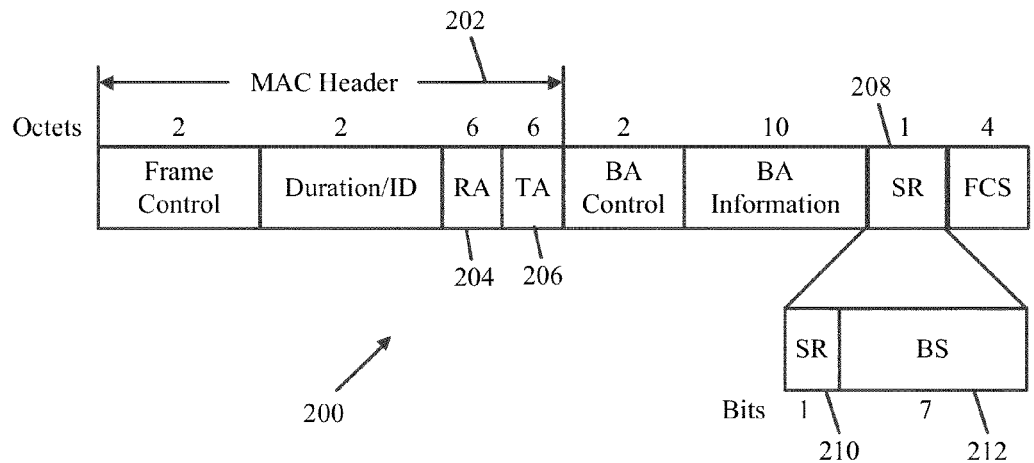
FIG. 2 is a schematic illustration of an Acknowledge (ACK) frame, in accordance with some demonstrative embodiments.

Reference is made to FIG. 2, which schematically illustrates an ACK frame 200, in accordance with some demonstrative embodiments. For example, ACK frame 200 may include an EACK frame, e.g., as described above. In one example, ACK frame 200 may be transmitted by a transmitter, e.g., transmitter 134 (FIG. 1), of a first wireless communication device, e.g., device 132 (FIG. 1), and received by a receiver, e.g., receiver 106 (FIG. 1), of a second wireless communication device, e.g., device 102 (FIG. 1).

In some demonstrative embodiments, ACK frame 200 may include a MAC header 202, which may include a Receive Address (RA) 204 of a device to receive ACK frame 200, e.g., a MAC address of device 102 (FIG. 1), and a Transmit Address (TA) 206 of a sender of ACK frame 200, e.g., a MAC address of device 132 (FIG. 1).

In some demonstrative embodiments, ACK frame 200 may include a scheduling request (SR) field 208, which may include a SR indicator 210 to indicate whether or not ACK frame 200 includes an uplink scheduling request. For example, SR indicator may include a bit having either a first value, e.g., zero, to indicate that a sender of ACK frame 200, e.g., device 132 (FIG. 1), does not request for uplink resources; or a second value, e.g., one, to indicate that ACK 200 includes a request for uplink resources from the sender of ACK frame 200, e.g., device 132 (FIG. 1).

In some demonstrative embodiments, SR field 208 may include a Buffer Size (BS) field 212, e.g., having a size of 7 bits or any other size, to indicate a total amount of data, e.g., in bytes or in any other data-size unit, requested to be transmitted in an UL transmission from the sender of ACK frame 200, e.g., device 132 (FIG. 1), to the receiver of ACK frame 200, e.g., device 102 (FIG. 1). For example, BS field 212 may identify a total amount of data buffered in one or more UL buffers of the sender of ACK frame 200, e.g., device 132 (FIG. 1).

In some demonstrative embodiments, the information in BS field 212 may also be utilized, for example, as part of a link adaptation process, a transmit power control process, and/or any other process or functionality.

Figure 3:
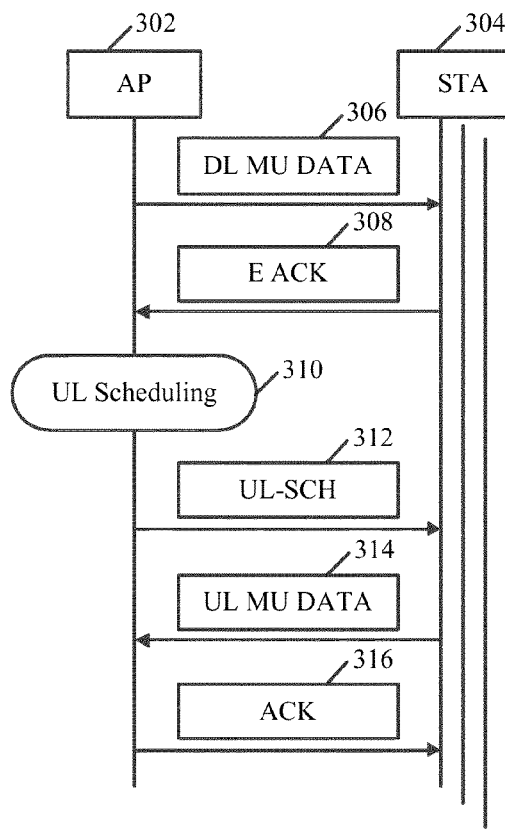
FIG. 3 is a schematic illustration of a sequence diagram of operations performed by an Access Point (AP) and a plurality of wireless stations, in accordance with some demonstrative embodiments.

Reference is made to FIG. 3, which schematically illustrates a sequence diagram of operations performed by an AP 302 and a plurality of wireless stations (STAs) 304, in accordance with some demonstrative embodiments. For example, AP 302 may perform the functionality of wireless communication device 102 (FIG. 1), and/or STAs 304 may perform the functionality of wireless communication devices 132, 160 and/or 170 (FIG. 1).

In some demonstrative embodiments, AP 302 may transmit a DL MU data transmission 306 to the plurality of STAs 304. For example, transmitter 104 (FIG. 1) may transmit DL MU data frames to devices 132, 160, and/or 170 (FIG. 1), e.g., as described above. The downlink MU data may be carried by OFDMA, SDMA multi-streams, mixed OFDMA with multi-streams, and/or according to any other MU scheme.

In some demonstrative embodiments, the plurality of STAs 304 may send to AP 302 a respective plurality of EACK frames 308 to confirm receipt of the DL MU data frames. Each EACK frame 308 may include, for example, SR field 208 (FIG. 2), e.g., as described above.

In some demonstrative embodiments, the plurality of EACK frames 308 may be transmitted separately, e.g., sequentially, or concurrently, e.g., using an OFDMA scheme, e.g., as described above.

In some demonstrative embodiments, AP 302 may perform UL Scheduling 310 to schedule UL transmissions from STAs 304, for example, based on the received EACK frames.

For example, when an EACK 308 from at least one STA 304 indicates that the at least one STA 304 has an UL request immediately after the transmission of the DL frames, AP 302 may make an SR assignment based on the BS field 212 (FIG. 2) of the EACK 308.

In one example, all the STAs 304 may have an UL request, e.g., if the SR bit 210 (FIG. 1) is set to the value one in each of the EACK frames 308. According to this example, AP 302 may assign UL resources to all STAs 304, e.g., based on the requested UL resources indicated by the BS fields 212 (FIG. 2).

In another example, one or more of the STAs 304 may not have an UL request, e.g., if the SR bit 210 (FIG. 2) is set to zero in one or more of the EACK frames 308. According to this example, AP 302 may assign additional UL resources to other STAs that have an UL request, e.g., based on the BS fields 212 (FIG. 2).

In some demonstrative embodiments, AP 302 may send to STAs 304 UL scheduling (UL-SCH) frames 312 including scheduling information to assign UL resources to the STAs 304. For example, transmitter 104 (FIG. 1) may transmit to device 132 (FIG. 1) an UL-SCH frame 312 including UL resources, e.g., in the form of synchronization information, e.g., time, frequency, and/or power, corresponding to the uplink transmission scheduled for device 132 (FIG. 1).

In some demonstrative embodiments, STAs 304 may send UL MU DATA frames 314 to AP 302, for example, based on the parameter settings of frequency, timing and power from UL-SCH frames 310.

In some demonstrative embodiments, AP 302 may send one or more ACK frames 316, for example, to acknowledge safe receipt of one or more of the UL MU DATA frames 314.

Figure 4:
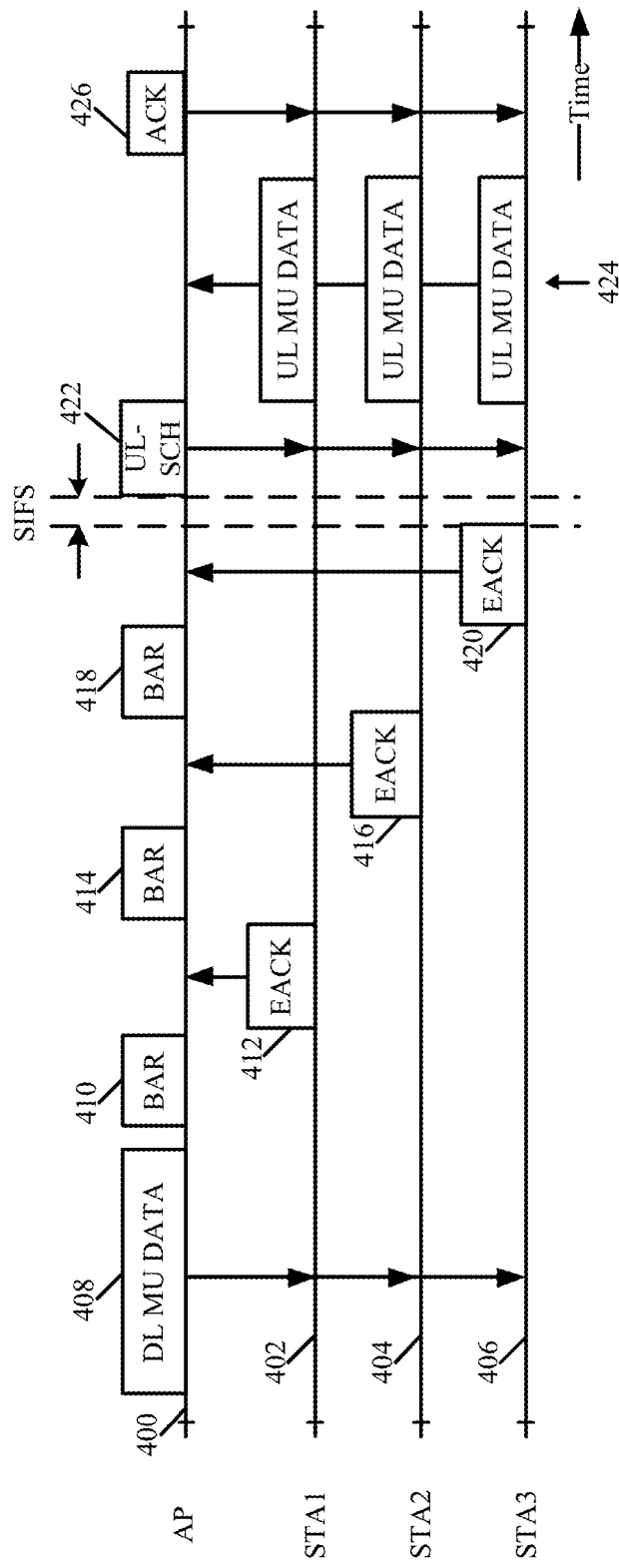
FIG. 4 is a schematic illustration of communications between an AP, and three wireless stations, in accordance with some demonstrative embodiments.

Reference is made to FIG. 4, which schematically illustrates communications between an AP 400, a first wireless station (STA1) 402, a second wireless station (STA2) 404, and a third wireless station (STA3) 406, in accordance with some demonstrative embodiments. For example, AP 400 may perform the functionality of device 102 (FIG. 1), wireless station 402 may perform the functionality of device 132 (FIG. 1), wireless station 404 may perform the functionality of device 160 (FIG. 1), and/or wireless station 406 may perform the functionality of device 170 (FIG. 1).

In some demonstrative embodiments, AP 400 may transmit a DL MU data transmission 408 to wireless stations 402, 404 and 406, e.g., as described above.

In some demonstrative embodiments, AP 400 may transmit an ACK request 410, e.g., a Block ACK Request (BAR), to wireless station 402, e.g., subsequent to the MU downlink transmission 408; and wireless station 402 may receive the ACK request 412, and transmit an ACK 412, e.g., an EACK 200 (FIG. 2), in response to the ACK request 410.

In some demonstrative embodiments, AP 400 may transmit an ACK request 414, e.g., a BAR, to wireless station 404, e.g., subsequent to receipt of ACK 412; and wireless station 404 may receive the ACK request 414, and transmit an ACK 416, e.g., an EACK 200 (FIG. 2), in response to the ACK request 414.

In some demonstrative embodiments, AP 400 may transmit an ACK request 418, e.g., a BAR, to wireless station 406, e.g., subsequent to receipt of ACK 416; and wireless station 406 may receive the ACK request 418, and transmit an ACK 420, e.g., an EACK 200 (FIG. 2), in response to the ACK request 418.

In some demonstrative embodiments, ACK frames 412, 416 and/or 420 may include uplink scheduling requests from wireless stations 402, 404 and/or 406, e.g., as described above.

In some demonstrative embodiments, AP 400 may schedule UL transmissions from wireless stations 402, 404 and/or 406, for example, based on uplink scheduling requests in ACK frames 412, 416 and/or 420, e.g., as described above.

In some demonstrative embodiments, AP 400 may transmit to wireless stations one or more UL scheduling (UL-SCH) frames 422 including scheduling information of the uplink transmissions, e.g., as described above.

In some demonstrative embodiments, AP 400 may transmit the UL scheduling frames, e.g., after waiting a SIFS period from reception of ACK 420.

In some demonstrative embodiments, wireless stations 402, 404 and/or 406 may transmit UL MU data frames 424 to AP 400, for example, according to the scheduling information, e.g., as described above.

In some demonstrative embodiments, AP 400 may transmit one or more ACK frames 426 to acknowledge receipt of UL MU data frames 424.

Figure 5:
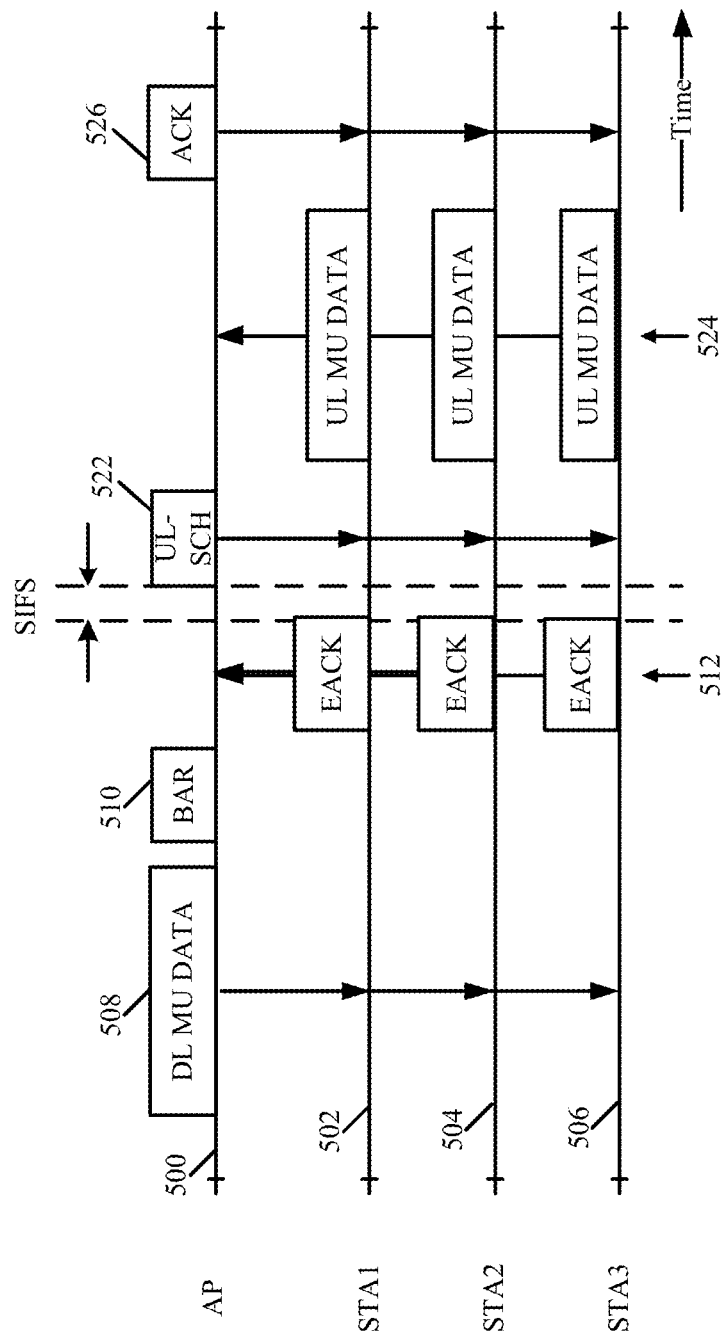
FIG. 5 is a schematic illustration of communications between an AP, and three wireless stations, in accordance with some demonstrative embodiments.

Reference is made to FIG. 5, which schematically illustrates communications between an AP 500, a first wireless station (STA1) 502, a second wireless station (STA2) 504, and a third wireless station (STA3) 506, in accordance with some demonstrative embodiments. For example, AP 500 may perform the functionality of device 102 (FIG. 1), wireless station 502 may perform the functionality of device 132 (FIG. 1), wireless station 504 may perform the functionality of device 160 (FIG. 1), and/or wireless station 506 may perform the functionality of device 170 (FIG. 1).

In some demonstrative embodiments, AP 500 may transmit a DL MU data transmission 508 to wireless stations 502, 504 and 506, e.g., as described above.

In some demonstrative embodiments, AP 500 may transmit a MU ACK request 510, e.g., a Block ACK Request (BAR), to wireless stations 502, 504 and 506.

In some demonstrative embodiments, wireless stations 502, 504 and 506 may simultaneously transmit a plurality of ACK frames 512, e.g., each including an EACK 200 (FIG. 2), in response to the ACK request 510.

In some demonstrative embodiments, ACK frames 512 may include uplink scheduling requests from wireless stations 502, 504 and/or 506, e.g., as described above.

In some demonstrative embodiments, AP 500 may schedule UL transmissions from wireless stations 502, 504 and/or 506, for example, based on uplink scheduling requests in ACK frames 512, e.g., as described above.

In some demonstrative embodiments, AP 500 may transmit to wireless stations one or more UL scheduling (UL-SCH) frames 522 including scheduling information of the uplink transmissions, e.g., as described above.

In some demonstrative embodiments, AP 500 may transmit the UL scheduling frames 522, e.g., after waiting a SIFS period from reception of ACKs 512.

In some demonstrative embodiments, wireless stations 502, 504 and/or 506 may transmit UL MU data frames 524 to AP 500, for example, according to the scheduling information, e.g., as described above.

In some demonstrative embodiments, AP 500 may transmit one or more ACK frames 526 to acknowledge receipt of UL MU data frames 524.

Figure 6:
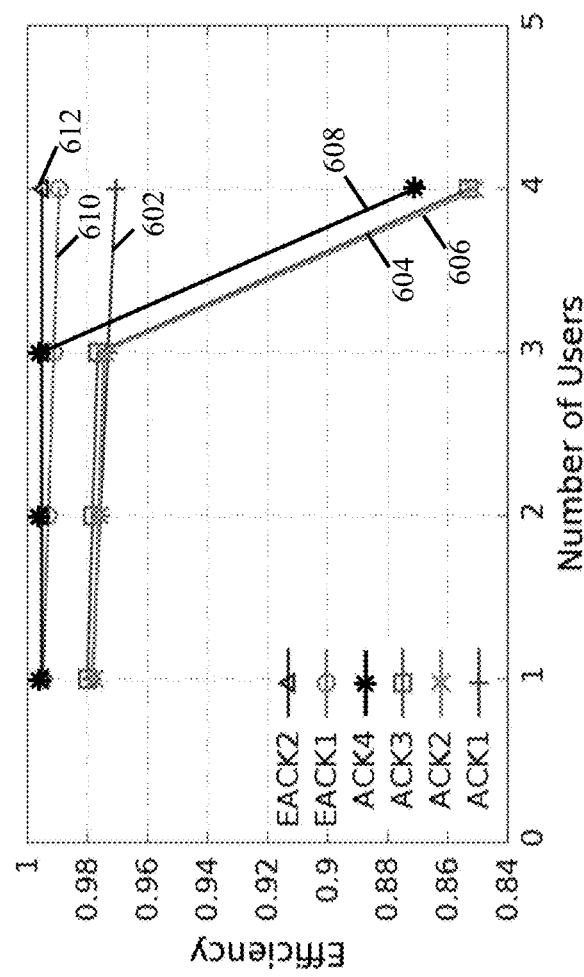
FIG. 6 is a schematic illustration of six graphs depicting network efficiency versus number of wireless stations (users) with respect to six respective uplink scheduling schemes, in accordance with some demonstrative embodiments.

Reference is made to FIG. 6, which illustrates six graphs depicting network efficiency versus number of wireless stations (users) with respect to six respective uplink scheduling schemes, in accordance with some demonstrative embodiments.

A graph 602 depicts the network efficiency with respect to an uplink scheduling scheme (ACK1) utilizing separate dedicated RTS messages, e.g., as described above. A graph 604 depicts the network efficiency with respect to an uplink scheduling scheme (ACK2) utilizing a group RTS scheme, e.g., as described above. A graph 606 depicts the network efficiency with respect to an uplink scheduling scheme (ACK3) utilizing a direct assignment scheme, e.g., as described above, with dedicated UL scheduling. A graph 608 depicts the network efficiency with respect to an uplink scheduling scheme (ACK4) utilizing a direct assignment scheme, e.g., as described above, without dedicated UL scheduling.

A graph 610 depicts the network efficiency with respect to an uplink scheduling scheme (EACK1) utilizing separate EACK frames, e.g., as described above with reference to FIG. 4.

A graph 612 depicts the network efficiency with respect to an uplink scheduling scheme (EACK2) utilizing simultaneous EACK frames, e.g., as described above with reference to FIG. 5.

The network efficiency depicted in FIG. 6 may represent a ratio between effective throughput and available bandwidth, e.g., as follows:

$$\text{Efficiency} = \frac{(sPayload_{DL} + sPayload_{UL}) * 8}{Time_{DL+UL} * \sum_{i=1}^{nUser} Rate_i} \quad (1)$$

wherein $sPayload_{DL}$ denotes a total size, e.g., in bytes, of DL data frames, $sPayload_{UL}$ denotes a total size, e.g., in bytes, of UL data frames, nUser denotes the number of users, $Rate_i$ denotes a maximum data rate of an i-th user corresponding to a chosen Modulation and Coding Scheme (MCS), and $Time_{DL+UL}$ denotes a transmission time, e.g., including control frames, data frames, ACK frames, and interframe spaces, of a DL/UL period.

In some demonstrative embodiments, the network efficiency of FIG. 6 is calculated based on the assumptions that both DL and UL data frames may be received correctly without retransmission; and that at least one user has an UL Schedule Request after DL transmission.

The graphs of FIG. 6, with respect to 1 to 3 users, relate to case when all the users have an UL request after DL transmissions, and, with respect to 4 users, to a case where only 3 users have an UL request.

As shown in FIG. 6, using the EACK to send the UL request from the users to the AP, as depicted by graphs 610 and 612, may significantly improve the network efficiency compared to other schemes, e.g., as depicted by graphs 602,

604, 606 and 608. For example, when all the users have an UL request, the EACK schemes may provide about 2% improvement, and when one of four users has no UL request, the EACK schemes may provide about 14-16% improvement.

Figure 7:
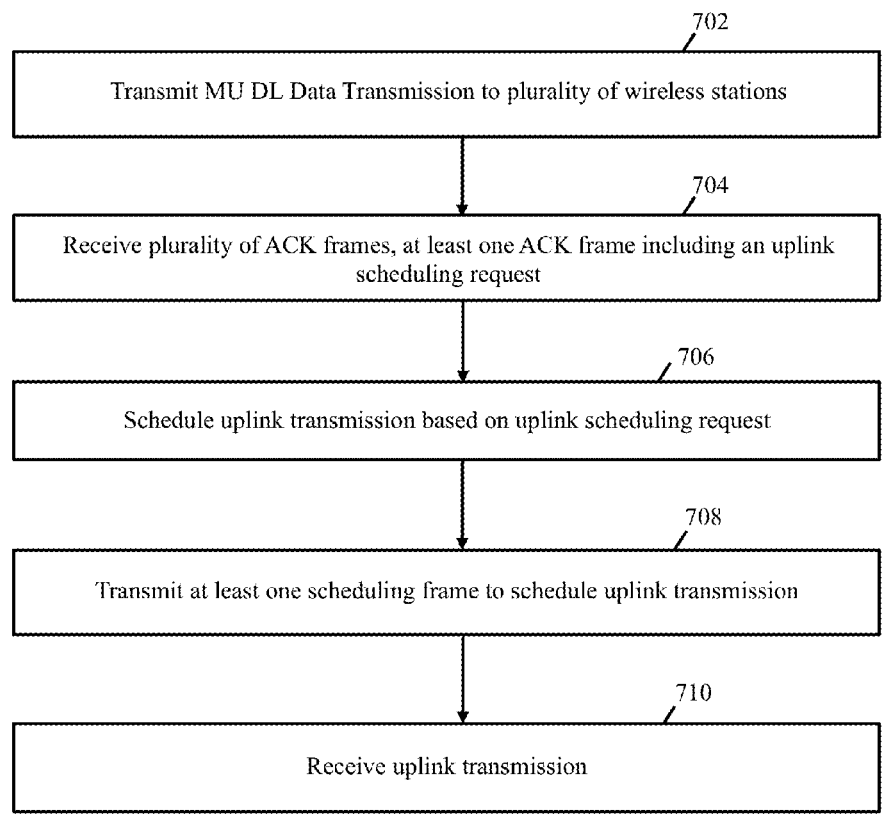
FIG. 7 is a schematic flow-chart illustration of a method of multi-user uplink transmission, in accordance with some demonstrative embodiments.

Reference is made to FIG. 7, which schematically illustrates a method of MU uplink transmission, in accordance with some demonstrative embodiments. In some demonstrative embodiments, one or more of the operations of the method of FIG. 7 may be performed by one or more elements of a system, e.g., system 100 (FIG. 1), for example, a wireless communication device, e.g., wireless communication device 102 (FIG. 1).

As indicated at block 702, the method may include transmitting a MU downlink transmission to a plurality of wireless stations. For example, transmitter 104 (FIG. 1) may transmit a MU DL data transmission to devices 132, 160 and/or 170 (FIG. 1), e.g., as described above.

As indicated at block 704, the method may include receiving from the plurality of wireless stations a plurality of ACK frames, at least one ACK frame from at least one wireless station including an uplink scheduling request indicating uplink resources requested by the wireless station. For example, receiver 106 (FIG. 1) may receive a plurality of EACK frames 200 (FIG. 2) from devices 132, 160 and/or 170 (FIG. 1), wherein at least one EACK frame, e.g., from device 132 (FIG. 1) includes an UL scheduling request, e.g., as described above.

As indicated at block 706, the method may include scheduling an uplink transmission from the at least one wireless station based on the uplink scheduling request. For example, scheduler 110 (FIG. 1) may schedule at least one UL data transmission from at least one of devices 132, 160 and 170 (FIG. 1), e.g., as described above.

As indicated at block 708, the method may include transmitting at least one scheduling frame including scheduling information of the scheduled uplink transmission. For example, transmitter 104 (FIG. 1) may transmit at least one UL-SCH frame to schedule the UL transmission, e.g., as described above.

As indicated at block 710, the method may include receiving the UL transmission from the one or more wireless stations. For example, receiver 106 (FIG. 1) may receive the MU UL data transmission from devices 132, 160 and/or 170 (FIG. 1), e.g., as described above.

Figure 8:
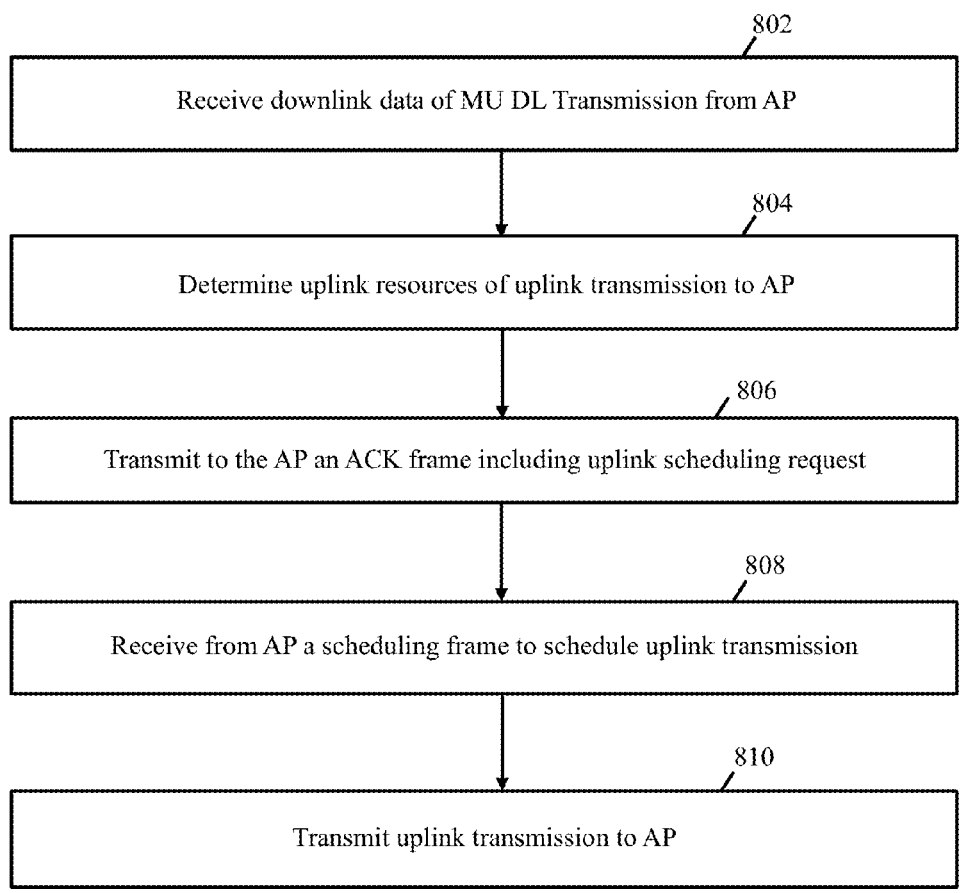
FIG. 8 is a schematic flow-chart illustration of a method of multi-user uplink transmission, in accordance with some demonstrative embodiments.

Reference is made to FIG. 8, which schematically illustrates a method of MU uplink transmission, in accordance with some demonstrative embodiments. In some demonstrative embodiments, one or more of the operations of the method of FIG. 8 may be performed by one or more elements of a system, e.g., system 100 (FIG. 1), for example, a wireless communication device, e.g., wireless communication device 132 (FIG. 1).

As indicated at block 802, the method may include receiving downlink data of a MU downlink transmission from an AP. For example, receiver 136 (FIG. 1) may receive a MU DL data transmission from device 102 (FIG. 1), e.g., as described above.

As indicated at block 804, the method may include determining uplink resources of an uplink transmission to the AP. For example, controller 140 (FIG. 1) may determine requested uplink resources of an uplink transmission from device 132 (FIG. 1) to device 102 (FIG. 1), e.g., as described above.

As indicated at block 806, the method may include transmitting to the AP an ACK frame to acknowledge receipt of the downlink data, the ACK frame including an uplink scheduling request indicating the uplink resources. For example, transmitter 134 (FIG. 1) may transmit to AP 102 (FIG. 1) an EACK frame 200 (FIG. 2) indicating the requested uplink resources, e.g., as described above.

As indicated at block 808, the method may include receiving from the AP a scheduling frame including scheduling information to schedule the UL transmission to the AP. For example, receiver 136 (FIG. 1) may receive the UL-SCH frame from AP 102 (FIG. 1), e.g., as described above.

As indicated at block 810, the method may include transmitting the UL transmission to the AP. For example, transmitter 134 (FIG. 1) may transmit the UL transmission to AP 102 (FIG. 1), e.g., as described above.

Figure 9:
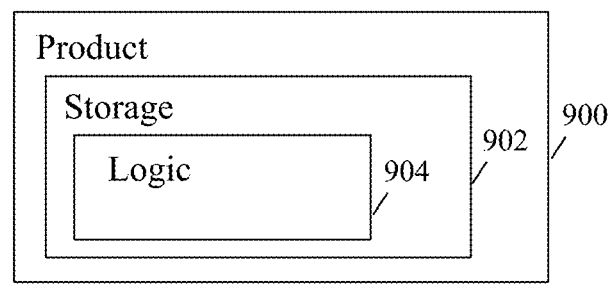
FIG. 9 is a schematic illustration of a product of manufacture, in accordance with some demonstrative embodiments.

Reference is made to FIG. 9, which schematically illustrates a product of manufacture 900, in accordance with some demonstrative embodiments. Product 900 may include a non-transitory machine-readable storage medium 902 to store logic 904, which may be used, for example, to perform at least part of the functionality of device 102 (FIG. 1), device 132 (FIG. 1), device 160 (FIG. 1), device 170 (FIG. 1), scheduler 110 (FIG. 1), controller 140 (FIG. 1), and/or to perform one or more of the operations of the method of FIG. 7 and/or FIG. 8. The phrase "non-transitory machine-readable medium" is directed to include all computer-readable media, with the sole exception being a transitory propagating signal.

In some demonstrative embodiments, product 900 and/or machine-readable storage medium 902 may include one or more types of computer-readable storage media capable of storing data, including volatile memory, non-volatile memory, removable or non-removable memory, erasable or non-erasable memory, writeable or re-writeable memory, and the like. For example, machine-readable storage medium 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a transmitter to transmit a multi-user (MU) downlink transmission to a plurality of wireless stations; a receiver to receive from the plurality of wireless stations a plurality of acknowledgement (ACK) frames, at least one ACK frame from at least one wireless station including an uplink scheduling request indicating uplink resources requested by the wireless station; and a scheduler to schedule an uplink transmission from the at least one wireless station based on the uplink scheduling request, the transmitter to transmit at least one scheduling frame including scheduling information of the scheduled uplink transmission.

Example 2 includes the subject matter of Example 1, and optionally, wherein the at least one ACK frame includes two or more ACK frames including two or more respective uplink scheduling requests from two or more wireless stations, the scheduler to schedule a MU uplink transmission from the two or more wireless stations based on the two or more uplink scheduling requests.

Example 3 includes the subject matter of Example 2, and optionally, wherein the MU uplink transmission comprises two or more simultaneous uplink data transmissions from the two or more wireless stations.

Example 4 includes the subject matter of any one of Examples 1-3, and optionally, wherein the ACK frame includes a scheduling request indicator to indicate the ACK frame includes the uplink scheduling request, and a size field indicating a data size of uplink data.

Example 5 includes the subject matter of any one of Examples 1-4, and optionally, wherein the scheduling information includes timing information indicating a timing of the scheduled uplink transmission, frequency information indicating a frequency of the scheduled uplink transmission, and transmit power information indicating a transmit power of the scheduled uplink transmission.

Example 6 includes the subject matter of any one of Examples 1-5, and optionally, wherein the transmitter is to transmit a unicast acknowledgement request to the wireless station, and the receiver is to receive the ACK frame in response to the unicast acknowledgement request.

Example 7 includes the subject matter of any one of Examples 1-6, and optionally, wherein the transmitter is to transmit a MU acknowledgement request to the plurality of wireless stations, and the receiver is to simultaneously receive the plurality of ACK frames in response to the MU acknowledgement request.

Example 8 includes the subject matter of any one of Examples 1-7, and optionally, wherein the transmitter is to transmit the scheduling frame a Short Inter Frame Space (SIFS) after receipt of the plurality of ACK frames.

Example 9 includes the subject matter of any one of Examples 1-8, and optionally, wherein the MU downlink transmission comprises a plurality of different downlink data transmissions simultaneously transmitted to the plurality of wireless stations.

Example 10 includes the subject matter of Example 9, and optionally, wherein the MU downlink transmission comprises a MU Multi-Input-Multi-Output (MU-MIMO) downlink transmission, or an Orthogonal Frequency-Division Multiple Access (OFDMA) downlink transmission.

Example 11 includes the subject matter of any one of Examples 1-10 being an Access Point (AP) including one or more antennas, a processor, and a memory.

Example 12 includes an apparatus comprising a receiver to receive downlink data of a Multi-User (MU) downlink transmission from an Access Point (AP); a controller to determine uplink resources of an uplink transmission to the AP; and a transmitter to transmit to the AP an acknowledgement (ACK) frame to acknowledge receipt of the downlink data, the ACK frame including an uplink scheduling request indicating the uplink resources.

Example 13 includes the subject matter of Example 12, and optionally, wherein the receiver is to receive a scheduling frame including scheduling information to schedule the uplink transmission, the scheduling information being based on the uplink scheduling request, the transmitter to transmit the uplink transmission based on the scheduling information.

Example 14 includes the subject matter of Example 13, and optionally, wherein the scheduling information includes timing information indicating a timing of the scheduled uplink transmission, frequency information indicating a frequency of the scheduled uplink transmission, and transmit power information indicating a transmit power of the scheduled uplink transmission.

Example 15 includes the subject matter of Example 13 or 14, and optionally, wherein the scheduling frame comprises a MU scheduling frame.

Example 16 includes the subject matter of any one of Examples 12-15, and optionally, wherein the ACK frame includes a scheduling request indicator to indicate the ACK frame includes the uplink scheduling request, and a size field indicating a data size of uplink data.

Example 17 includes the subject matter of any one of Examples 12-16, and optionally, wherein the receiver is to receive a unicast acknowledgement request from the AP, and the transmitter is to transmit the ACK frame in response to the unicast acknowledgement request.

Example 18 includes the subject matter of any one of Examples 12-16, and optionally, wherein the receiver is to receive a MU acknowledgement request from the AP, and the transmitter is to transmit the ACK frame in response to the MU acknowledgement request.

Example 19 includes the subject matter of any one of Examples 12-18, and optionally, wherein the MU downlink transmission comprises a MU Multi-Input-Multi-Output (MU-MIMO) downlink transmission, or an Orthogonal Frequency-Division Multiple Access (OFDMA) downlink transmission.

Example 20 includes the subject matter of any one of Examples 12-19 being a wireless station including one or more antennas, a processor, and a memory.

Example 21 includes an access Point (AP) comprising one or more antennas; a memory; a processor; a transmitter to transmit a multi-user (MU) downlink transmission to a plurality of wireless stations; a receiver to receive from the plurality of wireless stations a plurality of acknowledgement (ACK) frames, at least one ACK frame from at least one wireless station including an uplink scheduling request indicating uplink resources requested by the wireless station; and a scheduler to schedule an uplink transmission from the at least one wireless station based on the uplink scheduling request, the transmitter to transmit at least one scheduling frame including scheduling information of the scheduled uplink transmission.

Example 22 includes the subject matter of Example 21, and optionally, wherein the at least one ACK frame includes two or more ACK frames including two or more respective uplink scheduling requests from two or more wireless stations, the scheduler to schedule a MU uplink transmission from the two or more wireless stations based on the two or more uplink scheduling requests.

Example 23 includes the subject matter of Example 22, and optionally, wherein the MU uplink transmission comprises two or more simultaneous uplink data transmissions from the two or more wireless stations.

Example 24 includes the subject matter of any one of Examples 21-23, and optionally, wherein the ACK frame includes a scheduling request indicator to indicate the ACK frame includes the uplink scheduling request, and a size field indicating a data size of uplink data.

Example 25 includes the subject matter of any one of Examples 21-24, and optionally, wherein the scheduling information includes timing information indicating a timing of the scheduled uplink transmission, frequency information indicating a frequency of the scheduled uplink transmission, and transmit power information indicating a transmit power of the scheduled uplink transmission.

Example 26 includes the subject matter of any one of Examples 21-25, and optionally, wherein the transmitter is to transmit a unicast acknowledgement request to the wireless station, and the receiver is to receive the ACK frame in response to the unicast acknowledgement request.

Example 27 includes the subject matter of any one of Examples 21-26, and optionally, wherein the transmitter is to transmit a MU acknowledgement request to the plurality of wireless stations, and the receiver is to simultaneously receive the plurality of ACK frames in response to the MU acknowledgement request.

Example 28 includes the subject matter of any one of Examples 21-27, and optionally, wherein the transmitter is to transmit the scheduling frame a Short Inter Frame Space (SIFS) after receipt of the plurality of ACK frames.

Example 29 includes the subject matter of any one of Examples 21-28, and optionally, wherein the MU downlink transmission comprises a plurality of different downlink data transmissions simultaneously transmitted to the plurality of wireless stations.

Example 30 includes the subject matter of Example 29, and optionally, wherein the MU downlink transmission comprises a MU Multi-Input-Multi-Output (MU-MIMO) downlink transmission, or an Orthogonal Frequency-Division Multiple Access (OFDMA) downlink transmission.

Example 31 includes a wireless station comprising one or more antennas; a memory; a processor; a receiver to receive downlink data of a Multi-User (MU) downlink transmission from an Access Point (AP); a controller to determine uplink resources of an uplink transmission to the AP; and a transmitter to transmit to the AP an acknowledgement (ACK) frame to acknowledge receipt of the downlink data, the ACK frame including an uplink scheduling request indicating the uplink resources.

Example 32 includes the subject matter of Example 31, and optionally, wherein the receiver is to receive a scheduling frame including scheduling information to schedule the uplink transmission, the scheduling information being based on the uplink scheduling request, the transmitter to transmit the uplink transmission based on the scheduling information.

Example 33 includes the subject matter of Example 32, and optionally, wherein the scheduling information includes timing information indicating a timing of the scheduled uplink transmission, frequency information indicating a frequency of the scheduled uplink transmission, and transmit power information indicating a transmit power of the scheduled uplink transmission.

Example 34 includes the subject matter of Example 32 or 33, and optionally, wherein the scheduling frame comprises a MU scheduling frame.

Example 35 includes the subject matter of any one of Examples 31-34, and optionally, wherein the ACK frame includes a scheduling request indicator to indicate the ACK frame includes the uplink scheduling request, and a size field indicating a data size of uplink data.

Example 36 includes the subject matter of any one of Examples 31-35, and optionally, wherein the receiver is to receive a unicast acknowledgement request from the AP, and the transmitter is to transmit the ACK frame in response to the unicast acknowledgement request.

Example 37 includes the subject matter of any one of Examples 31-35, and optionally, wherein the receiver is to receive a MU acknowledgement request from the AP, and the transmitter is to transmit the ACK frame in response to the MU acknowledgement request.

Example 38 includes the subject matter of any one of Examples 31-37, and optionally, wherein the MU downlink transmission comprises a MU Multi-Input-Multi-Output (MU-MIMO) downlink transmission, or an Orthogonal Frequency-Division Multiple Access (OFDMA) downlink transmission.

Example 39 includes a method performed by an Access point (AP), the method comprising transmitting a multi-user (MU) downlink transmission to a plurality of wireless stations; receiving from the plurality of wireless stations a plurality of acknowledgement (ACK) frames, at least one ACK frame from at least one wireless station including an uplink scheduling request indicating uplink resources requested by the wireless station; scheduling an uplink transmission from the at least one wireless station based on the uplink scheduling request; and transmitting at least one scheduling frame including scheduling information of the scheduled uplink transmission.

Example 40 includes the subject matter of Example 39, and optionally, wherein the at least one ACK frame includes two or more ACK frames including two or more respective uplink scheduling requests from two or more wireless stations, and wherein scheduling the uplink transmission comprises scheduling a MU uplink transmission from the two or more wireless stations based on the two or more uplink scheduling requests.

Example 41 includes the subject matter of Example 39, and optionally, wherein the MU uplink transmission comprises two or more simultaneous uplink data transmissions from the two or more wireless stations.

Example 42 includes the subject matter of any one of Examples 39-41, and optionally, wherein the ACK frame includes a scheduling request indicator to indicate the ACK frame includes the uplink scheduling request, and a size field indicating a data size of uplink data.

Example 43 includes the subject matter of any one of Examples 39-42, and optionally, wherein the scheduling information includes timing information indicating a timing of the scheduled uplink transmission, frequency information indicating a frequency of the scheduled uplink transmission, and transmit power information indicating a transmit power of the scheduled uplink transmission.

Example 44 includes the subject matter of any one of Examples 39-43, and optionally, comprising transmitting a unicast acknowledgement request to the wireless station, and receiving the ACK frame in response to the unicast acknowledgement request.

Example 45 includes the subject matter of any one of Examples 39-43, and optionally, comprising transmitting a MU acknowledgement request to the plurality of wireless stations, and simultaneously receiving the plurality of ACK frames in response to the MU acknowledgement request.

Example 46 includes the subject matter of any one of Examples 39-44, and optionally, comprising transmitting the scheduling frame a Short Inter Frame Space (SIFS) after receipt of the plurality of ACK frames.

Example 47 includes the subject matter of any one of Examples 38-45, and optionally, wherein the MU downlink transmission comprises a plurality of different downlink data transmissions simultaneously transmitted to the plurality of wireless stations.

Example 48 includes the subject matter of Example 47, and optionally, wherein the MU downlink transmission comprises a MU Multi-Input-Multi-Output (MU-MIMO) downlink transmission, or an Orthogonal Frequency-Division Multiple Access (OFDMA) downlink transmission.

Example 49 includes a method performed by a wireless station, the method comprising receiving downlink data of a Multi-User (MU) downlink transmission from an Access Point (AP); determining uplink resources of an uplink transmission to the AP; and transmitting to the AP an acknowledgement (ACK) frame to acknowledge receipt of the downlink data, the ACK frame including an uplink scheduling request indicating the uplink resources.

Example 50 includes the subject matter of Example 49, and optionally, comprising receiving a scheduling frame including scheduling information to schedule the uplink transmission, the scheduling information being based on the uplink scheduling request, and transmitting the uplink transmission based on the scheduling information.

Example 51 includes the subject matter of Example 50, and optionally, wherein the scheduling information includes timing information indicating a timing of the scheduled uplink transmission, frequency information indicating a frequency of the scheduled uplink transmission, and transmit power information indicating a transmit power of the scheduled uplink transmission.

Example 52 includes the subject matter of Example 50 or 51, and optionally, wherein the scheduling frame comprises a MU scheduling frame.

Example 53 includes the subject matter of any one of Examples 49-52, and optionally, wherein the ACK frame includes a scheduling request indicator to indicate the ACK frame includes the uplink scheduling request, and a size field indicating a data size of uplink data.

Example 54 includes the subject matter of any one of Examples 49-53, and optionally, comprising receiving a unicast acknowledgement request from the AP, and transmitting the ACK frame in response to the unicast acknowledgement request.

Example 55 includes the subject matter of any one of Examples 49-53, and optionally, comprising receiving a MU acknowledgement request from the AP, and transmitting the ACK frame in response to the MU acknowledgement request.

Example 56 includes the subject matter of any one of Examples 49-55, and optionally, wherein the MU downlink transmission comprises a MU Multi-Input-Multi-Output (MU-MIMO) downlink transmission, or an Orthogonal Frequency-Division Multiple Access (OFDMA) downlink transmission.

Example 57 includes a product including one or more tangible computer-readable non-transitory storage media comprising computer-executable instructions operable to, when executed by at least one computer processor, enable the at least one computer processor to implement a method at an Access Point (AP), the method comprising transmitting a multi-user (MU) downlink transmission to a plurality of wireless stations; receiving from the plurality of wireless stations a plurality of acknowledgement (ACK) frames, at least one ACK frame from at least one wireless station including an uplink scheduling request indicating uplink resources requested by the wireless station; scheduling an uplink transmission from the at least one wireless station based on the uplink scheduling request; and transmitting at least one scheduling frame including scheduling information of the scheduled uplink transmission.

Example 58 includes the subject matter of Example 57, and optionally, wherein the at least one ACK frame includes two or more ACK frames including two or more respective uplink scheduling requests from two or more wireless stations, and wherein scheduling the uplink transmission comprises scheduling a MU uplink transmission from the two or more wireless stations based on the two or more uplink scheduling requests.

Example 59 includes the subject matter of Example 58, and optionally, wherein the MU uplink transmission comprises two or more simultaneous uplink data transmissions from the two or more wireless stations.

Example 60 includes the subject matter of any one of Examples 57-59, and optionally, wherein the ACK frame includes a scheduling request indicator to indicate the ACK frame includes the uplink scheduling request, and a size field indicating a data size of uplink data.

Example 61 includes the subject matter of any one of Examples 57-60, and optionally, wherein the scheduling information includes timing information indicating a timing of the scheduled uplink transmission, frequency information indicating a frequency of the scheduled uplink transmission, and transmit power information indicating a transmit power of the scheduled uplink transmission.

Example 62 includes the subject matter of any one of Examples 57-61, and optionally, wherein the method comprises transmitting a unicast acknowledgement request to the wireless station, and receiving the ACK frame in response to the unicast acknowledgement request.

Example 63 includes the subject matter of any one of Examples 57-61, and optionally, wherein the method comprises transmitting a MU acknowledgement request to the plurality of wireless stations, and simultaneously receiving the plurality of ACK frames in response to the MU acknowledgement request.

Example 64 includes the subject matter of any one of Examples 57-63, and optionally, wherein the method comprises transmitting the scheduling frame a Short Inter Frame Space (SIFS) after receipt of the plurality of ACK frames.

Example 65 includes the subject matter of any one of Examples 57-64, and optionally, wherein the MU downlink transmission comprises a plurality of different downlink data transmissions simultaneously transmitted to the plurality of wireless stations.

Example 66 includes the subject matter of Example 65, and optionally, wherein the MU downlink transmission comprises a MU Multi-Input-Multi-Output (MU-MIMO) downlink transmission, or an Orthogonal Frequency-Division Multiple Access (OFDMA) downlink transmission.

Example 67 includes a product including one or more tangible computer-readable non-transitory storage media comprising computer-executable instructions operable to, when executed by at least one computer processor, enable the at least one computer processor to implement a method at a wireless station, the method comprising receiving downlink data of a Multi-User (MU) downlink transmission from an Access Point (AP); determining uplink resources of an uplink transmission to the AP; and transmitting to the AP an acknowledgement (ACK) frame to acknowledge receipt of the downlink data, the ACK frame including an uplink scheduling request indicating the uplink resources.

Example 68 includes the subject matter of Example 67, and optionally, wherein the method comprises receiving a scheduling frame including scheduling information to schedule the uplink transmission, the scheduling information being based on the uplink scheduling request, and transmitting the uplink transmission based on the scheduling information.

Example 69 includes the subject matter of Example 68, and optionally, wherein the scheduling information includes timing information indicating a timing of the scheduled uplink transmission, frequency information indicating a frequency of the scheduled uplink transmission, and transmit power information indicating a transmit power of the scheduled uplink transmission.

Example 70 includes the subject matter of Example 68 or 69, and optionally, wherein the scheduling frame comprises a MU scheduling frame.

Example 71 includes the subject matter of any one of Examples 67-70, and optionally, wherein the ACK frame includes a scheduling request indicator to indicate the ACK frame includes the uplink scheduling request, and a size field indicating a data size of uplink data.

Example 72 includes the subject matter of any one of Examples 67-71, and optionally, wherein the method comprises receiving a unicast acknowledgement request from the AP, and transmitting the ACK frame in response to the unicast acknowledgement request.

Example 73 includes the subject matter of any one of Examples 67-71, and optionally, wherein the method comprises receiving a MU acknowledgement request from the AP, and transmitting the ACK frame in response to the MU acknowledgement request.

Example 74 includes the subject matter of any one of Examples 67-73, and optionally, wherein the MU downlink transmission comprises a MU Multi-Input-Multi-Output (MU-MIMO) downlink transmission, or an Orthogonal Frequency-Division Multiple Access (OFDMA) downlink transmission.

Example 75 includes an apparatus comprising means for transmitting a multi-user (MU) downlink transmission from an Access Point (AP) to a plurality of wireless stations; means for receiving art the AP a plurality of acknowledgement (ACK) frames from the plurality of wireless stations, at least one ACK frame from at least one wireless station including an uplink scheduling request indicating uplink resources requested by the wireless station; means for scheduling an uplink transmission from the at least one wireless station based on the uplink scheduling request; and means for transmitting at least one scheduling frame including scheduling information of the scheduled uplink transmission.

Example 76 includes the subject matter of Example 75, and optionally, wherein the at least one ACK frame includes two or more ACK frames including two or more respective uplink scheduling requests from two or more wireless stations, and wherein scheduling the uplink transmission comprises scheduling a MU uplink transmission from the two or more wireless stations based on the two or more uplink scheduling requests.

Example 77 includes the subject matter of Example 75, and optionally, wherein the MU uplink transmission comprises two or more simultaneous uplink data transmissions from the two or more wireless stations.

Example 78 includes the subject matter of any one of Examples 75-77, and optionally, wherein the ACK frame includes a scheduling request indicator to indicate the ACK frame includes the uplink scheduling request, and a size field indicating a data size of uplink data.

Example 79 includes the subject matter of any one of Examples 75-78, and optionally, wherein the scheduling information includes timing information indicating a timing of the scheduled uplink transmission, frequency information indicating a frequency of the scheduled uplink transmission, and transmit power information indicating a transmit power of the scheduled uplink transmission.

Example 80 includes the subject matter of any one of Examples 75-79, and optionally, comprising means for transmitting a unicast acknowledgement request to the wireless station, and receiving the ACK frame in response to the unicast acknowledgement request.

Example 81 includes the subject matter of any one of Examples 75-79, and optionally, comprising means for transmitting a MU acknowledgement request to the plurality of wireless stations, and simultaneously receiving the plurality of ACK frames in response to the MU acknowledgement request.

Example 82 includes the subject matter of any one of Examples 75-81, and optionally, comprising means for transmitting the scheduling frame a Short Inter Frame Space (SIFS) after receipt of the plurality of ACK frames.

Example 83 includes the subject matter of any one of Examples 75-82, and optionally, wherein the MU downlink transmission comprises a plurality of different downlink data transmissions simultaneously transmitted to the plurality of wireless stations.

Example 84 includes the subject matter of Example 83, and optionally, wherein the MU downlink transmission comprises a MU Multi-Input-Multi-Output (MU-MIMO) downlink transmission, or an Orthogonal Frequency-Division Multiple Access (OFDMA) downlink transmission.

Example 85 includes an apparatus comprising means for receiving at a wireless station downlink data of a Multi-User (MU) downlink transmission from an Access Point (AP); means for determining at the wireless station uplink resources of an uplink transmission to the AP; and means for transmitting to the AP an acknowledgement (ACK) frame to acknowledge receipt of the downlink data, the ACK frame including an uplink scheduling request indicating the uplink resources.

Example 86 includes the subject matter of Example 85, and optionally, comprising means for receiving a scheduling frame including scheduling information to schedule the uplink transmission, the scheduling information being based on the uplink scheduling request, and transmitting the uplink transmission based on the scheduling information.

Example 87 includes the subject matter of Example 86, and optionally, wherein the scheduling information includes timing information indicating a timing of the scheduled uplink transmission, frequency information indicating a frequency of the scheduled uplink transmission, and transmit power information indicating a transmit power of the scheduled uplink transmission.

Example 88 includes the subject matter of Example 86 or 87, and optionally, wherein the scheduling frame comprises a MU scheduling frame.

Example 89 includes the subject matter of any one of Examples 85-88, and optionally, wherein the ACK frame includes a scheduling request indicator to indicate the ACK frame includes the uplink scheduling request, and a size field indicating a data size of uplink data.

Example 90 includes the subject matter of any one of Examples 85-89, and optionally, comprising means for receiving a unicast acknowledgement request from the AP, and transmitting the ACK frame in response to the unicast acknowledgement request.

Example 91 includes the subject matter of any one of Examples 85-89, and optionally, comprising means for receiving a MU acknowledgement request from the AP, and transmitting the ACK frame in response to the MU acknowledgement request.

Example 92 includes the subject matter of any one of Examples 85-91, and optionally, wherein the MU downlink transmission comprises a MU Multi-Input-Multi-Output (MU-MIMO) downlink transmission, or an Orthogonal Frequency-Division Multiple Access (OFDMA) downlink transmission.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
   a transmitter to transmit a multi-user (MU) downlink transmission to a plurality of wireless stations;
   a receiver to receive from the plurality of wireless stations a plurality of acknowledgement (ACK) frames, at least one ACK frame from at least one wireless station comprising an uplink scheduling request indicating uplink resources requested by the wireless station, said at least one ACK frame comprising two or more ACK frames comprising two or more respective uplink scheduling requests from two or more wireless stations; and
   a scheduler to schedule an uplink transmission from the at least one wireless station based on the uplink scheduling request, the transmitter to transmit at least one scheduling frame comprising scheduling information of the scheduled uplink transmission, the scheduler to schedule a MU uplink transmission from said two or more wireless stations based on said two or more uplink scheduling requests.

2. The apparatus of claim 1, wherein said scheduling information comprises timing information indicating a timing of the scheduled uplink transmission, frequency information indicating a frequency of the scheduled uplink transmission, and transmit power information indicating a transmit power of the scheduled uplink transmission.

3. The apparatus of claim 1, wherein said MU uplink transmission comprises two or more simultaneous uplink data transmissions from said two or more wireless stations.

4. The apparatus of claim 1, wherein said transmitter is to transmit a unicast acknowledgement request to said wireless station, and said receiver is to receive said ACK frame in response to said unicast acknowledgement request.

5. The apparatus of claim 1, wherein said transmitter is to transmit a MU acknowledgement request to said plurality of wireless stations, and said receiver is to simultaneously receive said plurality of ACK frames in response to said MU acknowledgement request.

6. The apparatus of claim 1, wherein said transmitter is to transmit said scheduling frame a Short Inter Frame Space (SIFS) after receipt of said plurality of ACK frames.

7. The apparatus of claim 1, wherein said MU downlink transmission comprises a plurality of different downlink data transmissions simultaneously transmitted to said plurality of wireless stations.

8. The apparatus of claim 7, wherein said MU downlink transmission comprises a MU Multi-Input-Multi-Output (MU-MIMO) downlink transmission, or an Orthogonal Frequency-Division Multiple Access (OFDMA) downlink transmission.

9. The apparatus of claim 1 comprising an Access Point (AP), the AP comprising one or more antennas, a processor, and a memory.

10. An apparatus comprising:
    a transmitter to transmit a multi-user MU downlink transmission to a plurality of wireless stations,
    a receiver to receive from the plurality of wireless stations a plurality of acknowledgement (ACK) frames, at least one ACK frame from at least one wireless station comprising an uplink scheduling request indicating uplink resources requested by the wireless station, said ACK frame comprising a scheduling request indicator to indicate said ACK frame comprises the uplink scheduling request, and a size field indicating a data size of uplink data; and
    a scheduler to schedule an uplink transmission from the at least one wireless station based on the uplink scheduling request, the transmitter to transmit at least one scheduling frame comprising scheduling information of the scheduled uplink transmission.

11. The apparatus of claim 10, wherein said scheduling information comprises timing information indicating a timing of the scheduled uplink transmission, frequency information indicating a frequency of the scheduled uplink transmission, and transmit power information indicating a transmit power of the scheduled uplink transmission.

12. An apparatus comprising:
    a receiver to receive downlink data of a Multi-User (MU) downlink transmission from an Access Point (AP);
    a controller to determine uplink resources of an uplink transmission to the AP; and
    a transmitter to transmit to said AP an acknowledgement (ACK) frame to acknowledge receipt of said downlink data, the ACK frame comprising an uplink scheduling request indicating the uplink resources, said ACK frame comprising a scheduling request indicator to indicate said ACK frame comprises the uplink scheduling request, and a size field indicating a data size of uplink data.

13. The apparatus of claim 12, wherein the receiver is to receive a scheduling frame comprising scheduling information to schedule said uplink transmission, the scheduling information based on said uplink scheduling request, the transmitter to transmit the uplink transmission based on the scheduling information.

14. The apparatus of claim 13, wherein said scheduling frame comprises a MU scheduling frame.

15. The apparatus of claim 13, wherein said scheduling information comprises timing information indicating a timing of the scheduled uplink transmission, frequency information indicating a frequency of the scheduled uplink transmission, and transmit power information indicating a transmit power of the scheduled uplink transmission.

16. The apparatus of claim 12, wherein said MU downlink transmission comprises a MU Multi-Input-Multi-Output (MU-MIMO) downlink transmission, or an Orthogonal Frequency-Division Multiple Access (OFDMA) downlink transmission.

17. The apparatus of claim 12 comprising a wireless station, the wireless station comprising one or more antennas, a processor, and a memory.

18. A product comprising one or more tangible computer-readable non-transitory storage media comprising computer-executable instructions operable to, when executed by at least one computer processor, enable the at least one computer processor to implement operations at an Access Point (AP), the operations comprising:
   transmitting a multi-user (MU) downlink transmission to a plurality of wireless stations;
   receiving from the plurality of wireless stations a plurality of acknowledgement (ACK) frames, at least one ACK frame from at least one wireless station comprising an uplink scheduling request indicating uplink resources requested by the wireless station, said at least one ACK frame comprising two or more ACK frames comprising two or more respective uplink scheduling requests from two or more wireless stations;
   scheduling an uplink transmission from the at least one wireless station based on the uplink scheduling request, scheduling the uplink transmission comprises scheduling a MU uplink transmission from said two or more wireless stations based on said two or more uplink scheduling requests; and
   transmitting at least one scheduling frame comprising scheduling information of the scheduled uplink transmission.

19. The product of claim 18, wherein said MU downlink transmission comprises a MU Multi-Input-Multi-Output (MU-MIMO) downlink transmission, or an Orthogonal Frequency-Division Multiple Access (OFDMA) downlink transmission.

20. A product comprising one or more tangible computer-readable non-transitory storage media comprising computer-executable instructions operable to, when executed by at least one computer processor, enable the at least one computer processor to implement operations at an Access Point (AP), the operations comprising:
   transmitting a multi-user (MU) downlink transmission to a plurality of wireless stations;
   receiving from the plurality of wireless stations a plurality of acknowledgement (ACK) frames, at least one ACK frame from at least one wireless station comprising an uplink scheduling request indicating uplink resources requested by the wireless station, said ACK frame comprising a scheduling request indicator to indicate said ACK frame comprises the uplink scheduling request, and a size field indicating a data size of uplink data;
   scheduling an uplink transmission from the at least one wireless station based on the uplink scheduling request; and
   transmitting at least one scheduling frame comprising scheduling information of the scheduled uplink transmission.

21. The product of claim 20, wherein the operations comprise transmitting said scheduling frame a Short Inter Frame Space (SIFS) after receipt of said plurality of ACK frames.

22. A product comprising one or more tangible computer-readable non-transitory storage media comprising computer-executable instructions operable to, when executed by at least one computer processor, enable the at least one computer processor to implement operations at a wireless station, the operations comprising:
   receiving downlink data of a Multi-User (MU) downlink transmission from an Access Point (AP);
   determining uplink resources of an uplink transmission to the AP; and
   transmitting to said AP an acknowledgement (ACK) frame to acknowledge receipt of said downlink data, the ACK frame comprising an uplink scheduling request indicating the uplink resources, said ACK frame comprising a scheduling request indicator to indicate said ACK frame comprises the uplink scheduling request, and a size field indicating a data size of uplink data.

23. The product of claim 22, wherein the operations comprise receiving a scheduling frame comprising scheduling information to schedule said uplink transmission, the scheduling information based on said uplink scheduling request, and transmitting the uplink transmission based on the scheduling information.

24. The product of claim 23, wherein said scheduling frame comprises a MU scheduling frame.

25. The product of claim 22, wherein said MU downlink transmission comprises a MU Multi-Input-Multi-Output (MU-MIMO) downlink transmission, or an Orthogonal Frequency-Division Multiple Access (OFDMA) downlink transmission.

* * * * *

UNITED STATES PATENT AND TRADEMARK OFFICE
CERTIFICATE OF CORRECTION

PATENT NO. : 9,462,607 B2
APPLICATION NO. : 14/470954
DATED : October 4, 2016
INVENTOR(S) : Yongsen Ma et al.

Page 1 of 1

It is certified that error appears in the above-identified patent and that said Letters Patent is hereby corrected as shown below:

In the Claims

In Column 28, Line 32, in Claim 10, delete "multi-user MU downlink" and insert -- multi-user (MU) downlink --, therefor.

Signed and Sealed this
Seventh Day of February, 2017

Michelle K. Lee
*Director of the United States Patent and Trademark Office*